United States Patent
Cuta et al.

(10) Patent No.: US 9,507,175 B2
(45) Date of Patent: Nov. 29, 2016

(54) METHODS AND DEVICES FOR EVALUATING EYEWEAR FIT

(71) Applicant: 3M INNOVATIVE PROPERTIES COMPANY, St. Paul, MN (US)

(72) Inventors: Karen Cuta, Stillwater, MN (US); Christopher J. Dujovski, Minneapolis, MN (US); Laurent Froissard, Cranston, RI (US); Christopher Henderson, Durham (GB); Donald Rust, St. Paul, MN (US); Andrew Stephen Viner, Roseville, MN (US)

(73) Assignee: 3M Innovative Properties Company, St. Paul, MN (US)

(*) Notice: Subject to any disclaimer, the term of this patent is extended or adjusted under 35 U.S.C. 154(b) by 110 days.

(21) Appl. No.: 13/652,854

(22) Filed: Oct. 16, 2012

(65) Prior Publication Data
US 2014/0104568 A1   Apr. 17, 2014

(51) Int. Cl.
*A61B 3/10* (2006.01)
*G02C 13/00* (2006.01)
*G02C 7/02* (2006.01)

(52) U.S. Cl.
CPC ............ *G02C 13/003* (2013.01); *G02C 7/027* (2013.01)

(58) Field of Classification Search
CPC ... G02C 7/027; G02C 13/003; G02C 13/005
USPC .................. 33/200, 511, 512, 810, 811, 812; 351/159.75, 204, 205
See application file for complete search history.

(56) References Cited

U.S. PATENT DOCUMENTS

| | | | | |
|---|---|---|---|---|
| 1,588,401 A * | 6/1926 | Fox | ................................. | 33/200 |
| 2,532,878 A * | 12/1950 | Aulin | ............................ | 356/125 |
| 2,632,257 A * | 3/1953 | Belgard | .......................... | 33/200 |
| 2,884,832 A * | 5/1959 | Engelmann | .................... | 351/204 |
| 3,752,566 A * | 8/1973 | Mathews | ........................ | 351/204 |
| 3,987,554 A * | 10/1976 | Pastore | ........................... | 33/200 |
| 4,208,800 A * | 6/1980 | Grolman et al. | ............... | 33/200 |
| 4,252,419 A * | 2/1981 | Padula et al. | .................. | 351/204 |
| 4,368,958 A * | 1/1983 | Buget | ............................ | 351/204 |
| 4,494,836 A * | 1/1985 | Cogez | ............................ | 351/204 |
| 4,531,297 A * | 7/1985 | Stoerr | ............................. | 33/200 |
| 4,575,946 A * | 3/1986 | Bommarito | ..................... | 33/200 |
| 4,591,246 A * | 5/1986 | Cousyn et al. | ................ | 351/204 |
| 4,646,445 A * | 3/1987 | Wehmeier | ........................ | 33/507 |
| 4,653,192 A * | 3/1987 | Conrad et al. | .................. | 33/200 |
| 4,817,024 A * | 3/1989 | Saigoh | ............................... | 703/1 |
| 5,109,609 A * | 5/1992 | Anderson | ......................... | 33/502 |

(Continued)

FOREIGN PATENT DOCUMENTS

| | | |
|---|---|---|
| WO | WO 97/29441 | 2/1997 |
| WO | WO 01/98730 | 12/2001 |
| WO | WO 2010/042990 | 4/2010 |

OTHER PUBLICATIONS

Harris, James, et al., Research to Practice, "Safety Eyewear: How Much Coverage Does it Provide?" pp. 22-27, Jul. 2009.

*Primary Examiner* — Bumsuk Won
*Assistant Examiner* — Collin X Beatty

(57) ABSTRACT

Methods and tools for evaluating fit of eyewear are provided. In an exemplary embodiment, the method includes steps of evaluating coverage provided by an eyewear article on the face of the wearer and evaluating a gap formed between a peripheral edge of the eyewear article and the face of the wearer.

25 Claims, 2 Drawing Sheets

(56) References Cited

U.S. PATENT DOCUMENTS

| | | | |
|---|---|---|---|
| 5,175,941 A * | 1/1993 | Ziegler et al. | 33/810 |
| 5,400,522 A | 3/1995 | Kremer | |
| 5,576,778 A * | 11/1996 | Fujie et al. | 351/159.66 |
| 5,592,248 A * | 1/1997 | Norton et al. | 351/246 |
| 5,617,155 A * | 4/1997 | Ducarouge et al. | 351/204 |
| 5,640,775 A * | 6/1997 | Marshall | 33/28 |
| 5,970,515 A | 10/1999 | Fishbaugh | |
| 6,622,816 B2 | 9/2003 | Falco | |
| 6,682,195 B2 | 1/2004 | Dreher | |
| 6,692,127 B2 | 2/2004 | Abitbol | |
| 6,944,327 B1 * | 9/2005 | Soatto | 382/154 |
| 7,434,931 B2 * | 10/2008 | Warden et al. | 351/204 |
| 7,665,843 B2 | 2/2010 | Xie | |
| 7,699,607 B2 * | 4/2010 | Margossian | 433/73 |
| 7,740,355 B2 | 6/2010 | Sessner | |
| 2002/0153192 A1 | 10/2002 | Falco | |
| 2003/0081173 A1 * | 5/2003 | Dreher | 351/204 |
| 2003/0090625 A1 * | 5/2003 | Izumitani et al. | 351/204 |
| 2003/0123026 A1 * | 7/2003 | Abitbol et al. | 351/204 |
| 2004/0207805 A1 | 10/2004 | Chovan | |
| 2005/0041209 A1 * | 2/2005 | Katzman et al. | 351/204 |
| 2006/0077342 A1 * | 4/2006 | Fischer | 351/204 |
| 2006/0274261 A1 * | 12/2006 | Andino et al. | 351/159 |
| 2007/0157483 A1 * | 7/2007 | DuMais | 33/512 |
| 2007/0193043 A1 * | 8/2007 | Katzman | 33/200 |
| 2008/0201329 A1 * | 8/2008 | Xie | 707/6 |
| 2009/0021693 A1 * | 1/2009 | Sessner et al. | 351/204 |
| 2009/0128579 A1 | 5/2009 | Xie | |
| 2009/0273612 A1 | 11/2009 | Xie | |
| 2010/0026955 A1 * | 2/2010 | Fisher et al. | 351/205 |
| 2010/0195045 A1 * | 8/2010 | Nauche et al. | 351/204 |
| 2010/0293251 A1 | 11/2010 | Suy | |
| 2011/0007269 A1 * | 1/2011 | Trumm et al. | 351/204 |
| 2011/0047807 A1 * | 3/2011 | Warntjes et al. | 33/200 |
| 2011/0157549 A1 * | 6/2011 | Wada | 351/204 |
| 2011/0242481 A1 * | 10/2011 | Wada | 351/204 |
| 2012/0016763 A1 | 1/2012 | Kirschner | |

* cited by examiner

METHODS AND DEVICES FOR EVALUATING EYEWEAR FIT

TECHNICAL FIELD

This invention relates to methods and devices for evaluating the fit of eyewear, in particular evaluating the fit of eyewear on a particular individual.

BACKGROUND

Eyewear articles, such as eyeglasses intended to correct a person's vision, and safety spectacles, intended to protect a person's eyes or face from harm, are widely known. These types of eyewear often rest on the nose, and above each ear of a user. A user's perception of eyewear comfort may be influenced by how well the eyewear fits on the nose and over the ears and the pressure exerted by temple portions on the head, perhaps together with whether the lenses of the eyewear are too close to the person's eyes or face, or other factors.

Prior eyewear articles have been selected on the basis of appearance, comfort, and desired vision correction. In addition, eyewear articles have been selected as more or less generally suitable for a given purpose, or as complying with various regulatory requirements.

SUMMARY

In reference to the invention, the following terms are defined as set forth below:

"lens" means a structure through which a user can see the surrounding environment and may include any suitable material.

"portion" means part of a larger thing.

"positioned for use" when referring to an eyewear article means the eyewear article is positioned generally in front of the eye or eyes of a user to provide the intended functionality of the eyewear article.

The present invention provides for a method of evaluating fit of an eyewear article including steps of positioning an eyewear article for use on a wearer, evaluating coverage provided by the eyewear article on the wearer's face, evaluating a gap formed between a peripheral edge of the eyewear article and the wearer's face, evaluating field of view of the wearer, and evaluating security of the eyewear article on the wearer during movement of the wearer's head. The method may occur in sequence or any desired order. In an exemplary embodiment, the step of evaluating coverage includes measuring a first vertical distance V1 between a location on a lens of the eyewear article substantially in front of a center of a pupil of the wearer and an upper peripheral edge of the eyewear article in a substantially vertical direction, measuring a second vertical distance V2 between a location on the lens substantially in front of a center of a pupil of the wearer and a lower peripheral edge of the eyewear article in a substantially vertical direction, measuring a first horizontal distance H1 between a location on the eyewear article substantially in front of a center of a pupil of the wearer and an outer peripheral edge of the eyewear article in a substantially horizontal direction, and measuring a second horizontal distance H2 between a location on the eyewear article substantially in front of a center of a pupil of the wearer and an inner peripheral edge of the eyewear article in a substantially horizontal direction. The step of evaluating a gap may include measuring a gap between a peripheral edge of the eyewear article and the wearer's face by positioning a sphere of known diameter D1 proximate the gap, and the step of evaluating the field of view of the wearer may include moving an object in and around the field of view of the wearer. In another exemplary embodiment, steps of evaluating coverage and gap including using a gauge comprising an elongate body having first and second ends and a sphere of diameter D1 at the first end. Further, an exemplary method includes the step of selecting an eyewear article based on one or more of the above steps.

The present invention further provides a method of evaluating fit of an eyewear article including steps of obtaining a model of at least a portion of a wearer's head, evaluating coverage provided by one or more eyewear articles over the wearer's face by comparing the model of at least a portion of the wearer's head with one or more eyewear article models, and evaluating a gap formed between a peripheral edge of one or more eyewear articles and the wearer's face by comparing the model of at least a portion of the wearer's head with one or more eyewear article models. In an exemplary embodiment, the model of at least a portion of the wearer's head is obtained while an eyewear article is positioned for use on the wearer. In various exemplary embodiments the step of evaluating coverage includes analyzing the one or more eyewear article models and the model of at least a portion of the wearer's head to determine a first vertical distance V1 between a location on the one or more eyewear article models in front of a center of a pupil of the wearer and an upper peripheral edge of the one or more eyewear article models in a substantially vertical direction, a second vertical distance V2 between a location on the one or more eyewear article models substantially in front of a center of a pupil of the wearer and a lower peripheral edge of the one or more eyewear article models in a substantially vertical direction, a first horizontal distance H1 between a location on the one or more eyewear article models substantially in front of a center of a pupil of the wearer and an outer peripheral edge of the one or more eyewear article models in a substantially horizontal direction, and a second horizontal distance H2 between a location on the one or more eyewear article models substantially in front of a center of a pupil of the wearer and an inner peripheral edge of the one or more eyewear article models in a substantially horizontal direction. In another exemplary embodiment, the step of evaluating a gap includes analyzing the one or more eyewear article models and the model of at least a portion of the wearer's head to determine a size of a gap between a peripheral edge of an eyewear article and the wearer's face. Various exemplary embodiments further include, before or after the above steps, evaluating field of view of the wearer by analyzing one or more eyewear article models and the model of at least a portion of the wearer's head to determine whether an eyewear article interferes with the wearer's field of view, and evaluating security by analyzing one or more eyewear article models and the model of at least a portion of the wearer's head. Further, an exemplary method includes the step of selecting an eyewear article based on one or more of the above steps.

The present invention further provides a gauge for evaluating fit of an eyewear article including an elongate body having first and second major surfaces and first and second end portions, a first sphere having a diameter D1 proximate the first end, and a second sphere having a diameter D2 proximate the second end. The first major surface is calibrated with a scale including a zero location and markings on each side of the zero location. In an exemplary embodiment, the markings on each side of the zero location are representative of a predetermined distance from the zero location to provide an indication whether coverage of an eyewear article on the face of a wearer in a particular direction is sufficient, and D1 is not equal to D2.

The method and devices of the present invention are suitable for use with safety spectacles, goggles, sunglasses, cosmetic spectacles, vision correction spectacles, and/or other eyewear articles as known in the art. The above summary of the present invention is not intended to describe each disclosed embodiment or every implementation of the present invention. The Figures and the Detailed Description, which follow, more particularly exemplify illustrative embodiments.

BRIEF DESCRIPTION OF DRAWINGS

The present invention will be further explained with reference to the appended Figures, wherein like structure is referred to by like numerals throughout the several views, and wherein.

DETAILED DESCRIPTION

The present invention provides methods and devices for evaluating the fit of eyewear, such as safety eyewear, on a particular individual. Occupational use of safety eyewear must be in compliance with applicable health and safety standards, such as standards provided by the Occupational Safety and Health Administration (OSHA) in the United States. Safety eyewear may also be subject to performance testing provided by the American National Standards Institute (ANSI) in the "American National Standard Practice for Occupational and Educational Personal Eye and Face Protective Devices," ANSI Z87.1, or other applicable health and safety standards. Current standards, however, provide little or no guidance on the evaluation of safety eyewear to evaluate the fit of safety eyewear on a particular individual. The fit of a particular eyewear article may vary greatly on different individuals having different head and face characteristics, and the fit may have a significant impact on appropriate usage by a wearer. Accordingly, the effectiveness of safety eyewear in protecting the eyes and face of a wearer depends in part on how the eyewear fits on the particular individual that will be wearing the eyewear.

In addition to a wearer's perception of comfort, there are a number of parameters that may be evaluated to determine the ability of an eyewear article to function as safety eyewear. Consideration of the shape and dimensions of an eyewear article relative to features of a particular wearer's face and head allow a determination to be made as to whether the particular eyewear article provides a desired level of protection. The present inventors have determined that fit of eyewear can be determined efficiently and precisely using specific parameters including, for example, coverage provided by the eyewear, presence and/or size of one or more gaps between an eyewear article and the face of a wearer, field of view of the wearer when the eyewear article is positioned for use, and security of the eyewear article on the face of a wearer. Consideration of such factors may additionally be used to facilitate selection of an eyewear article that provides a desired level of protection on a particular individual.

Coverage provided by an eyewear article is related to the surface area of the eyes and face shielded by the eyewear article and can be described as a projected area of the lens in front of the eyes and face of a wearer. In an exemplary embodiment, coverage is evaluated by considering the presence of a lens or other portion of the eyewear article at various distances from a reference point related to a feature of the head or face of a wearer. Greater coverage provided by an eyewear article reduces the area of the eyes and surrounding soft tissue that is exposed, and reduces the likelihood that contaminants, projectiles or debris may contact sensitive areas of the eye or face.

Figure 1:
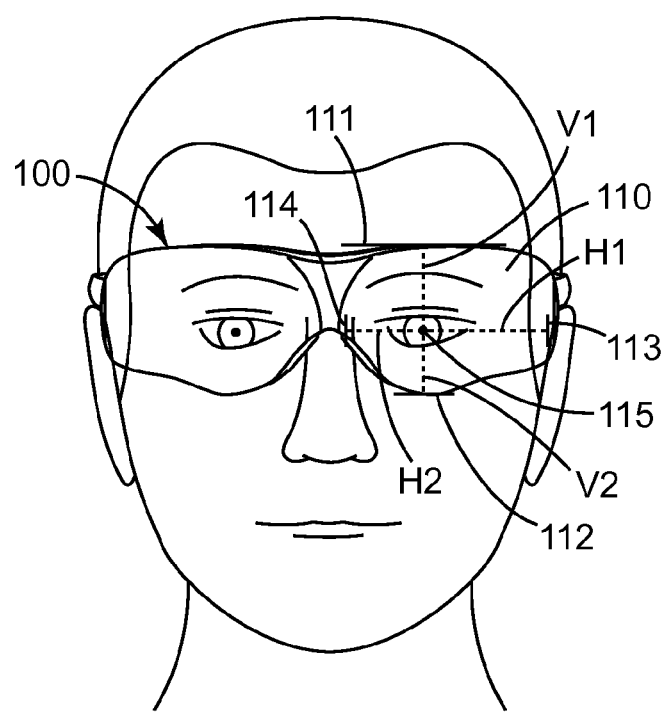
FIG. 1 is a front perspective view of an eyewear article positioned for use on a wearer illustrating exemplary distances V1, V2, H1 and H2 that may be considered in evaluating coverage provided by an eyewear article.

Referring to FIG. 1, coverage provided by exemplary eyewear 100 in a vertical direction may be evaluated by measuring a first vertical distance V1 between a reference location 115 on lens 110 substantially in front of a center of a pupil of the wearer and an upper peripheral edge 111 of eyewear 100 in a substantially vertical direction. Higher values of distance V1 generally suggest that eyewear 100 provides greater coverage, while lower values of distance V1 generally suggest that eyewear 100 provides lesser coverage.

In an exemplary embodiment, first vertical distance V1 is compared to a predetermined value V0 to determine whether coverage provided by eyewear 100 is sufficient. For example, a distance V1 greater than 15 mm, 20 mm, 25 mm, or another value, may be determined to result in sufficient coverage in the direction of distance V1 and thus predetermined value V0 is selected to be 15 mm, 20 mm, 25 mm, or another suitable value representing a minimum coverage in the direction of distance V1. In various exemplary embodiments, predetermined value V0 is selected to provide sufficient coverage for a particular application or may be established by a standard setting organization as providing an acceptable level of coverage.

In various exemplary embodiments of evaluating coverage, additional distances shown in FIG. 1 are measured on a lens relative to a reference location related to a feature of the head or face of a wearer. A second vertical distance V2 is measured between reference location 115 on lens 110 substantially in front of a center of a pupil of the wearer and a lower peripheral edge 112 of eyewear 100 in a substantially vertical direction. Similarly, coverage provided in a horizontal direction is evaluated by measuring a first horizontal distance H1 between reference location 115 on lens 110 substantially in front of a center of a pupil of the wearer and an outer peripheral edge 113 of eyewear 100 in a substantially horizontal direction, as shown in FIG. 1 for example. A second horizontal distance H2 is measured between reference location 115 and an inner peripheral edge 114, near a nose bridge for example, of eyewear 100 in a substantially horizontal direction. Higher values of distances V2, H1, and H2 generally suggest that eyewear 100 provides greater coverage, while lower values of distance V2, H1, and H2 generally suggest that eyewear 100 provides lesser coverage.

Second vertical distance V2 is also compared to a predetermined value to determine whether coverage is sufficient. The predetermined value may be a value determined as providing sufficient coverage for a particular application or may be established by a standard setting organization, for example, as providing an acceptable level of coverage, and may be the same or different than predetermined value V0. Similarly, first horizontal distance H1 and second horizontal distance H2 are compared to a predetermined value H0 to determine whether coverage in the direction of distances H1 and H2 are sufficient. As with predetermined value V0, predetermined value H0 may be a value determined to provide sufficient coverage for a particular application or may be established by a standard setting organization, for example, to provide an acceptable level of coverage.

Comparison of one or more of values V1, V2, H1 and H2 to predetermined values V0, H0 and/or other predetermined values may be used to determine whether, when positioned for use on a particular wearer, an eyewear article provides a desired level of protection. Alternatively or in addition, such a comparison may facilitate selection of an eyewear article by identifying one or more specific models, sizes, and/or configurations from an inventory of available eyewear articles that provide a desired level of protection to a desired user. For example, if one or more of distances V1, V2, H1 or H2 are less than a predetermined value, or otherwise determined to be insufficient to provide desired coverage, the eyewear article, and other eyewear articles having similar dimensions and characteristics, may similarly not provide a desired level of coverage.

Figure 2:
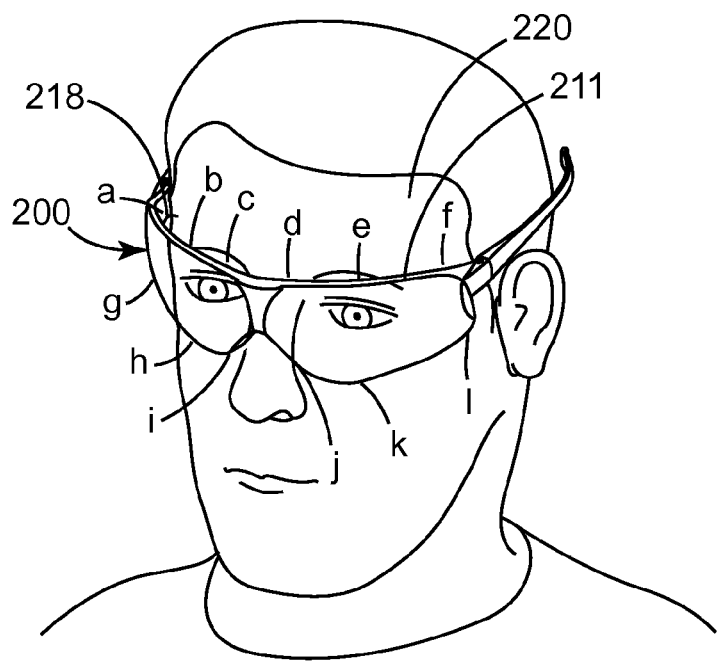
FIG. 2 is a front perspective view of an eyewear article positioned for use on a wearer illustrating exemplary locations for measuring one or more gaps between an eyewear article and the face of a wearer.

Referring to FIG. 2, proper fit of safety eyewear may further be evaluated by the presence and/or size of one or more gaps between the eyewear and the face of a wearer, specifically between an inner surface of a peripheral edge of the eyewear and the face of wearer at one or more locations along the perimeter of the eyewear. Some safety eyewear, such as goggles, may have no visible gap between a peripheral edge of the eyewear and the face of the wearer. Other safety eyewear, such as safety spectacles, exhibit a visible gap between the peripheral edge of the safety spectacles and the face of the wearer. For example, the safety spectacles may include a nose bridge or nose pads that contact the nose of a wearer and temple portions that rest above the ears of a wearer, while other portions of the eyewear, such as portions of the peripheral edges of a frame or lens, do not contact the face of a wearer resulting in a gap. An overly large gap may reduce the effectiveness of an eyewear article in protecting the eyes and surrounding soft tissue of a wearer because a larger space is provided through which contaminants, projectiles or debris may enter the space between the eyewear and the face.

Figure 3:
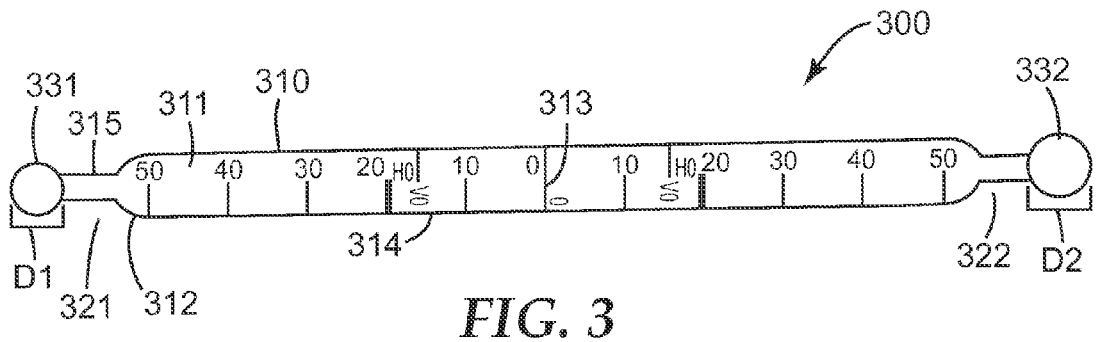
FIG. 3 is a front view of an exemplary measurement tool for evaluating coverage and gaps present when an eyewear article is positioned for use on a wearer.

In an exemplary embodiment, a gap 218 between an eyewear article and the face of a wearer is evaluated by measuring a distance between a peripheral edge of eyewear 200, such as upper peripheral edge 211 and the face 220 of a wearer at one or more locations when eyewear 200 is positioned for use on the wearer. Gap 218 formed between a peripheral edge of the eyewear and the face of a wearer can be measured by any suitable measuring tool. For example, gap 218 may be measured by positioning an object of known dimension, such as a sphere having a known diameter, adjacent to or within gap 218. In an exemplary embodiment, a sphere having a known diameter, such as sphere D1 shown in FIG. 3, is positioned adjacent to gap 218. If the sphere snugly fits between eyewear 200 and the face of the wearer, the width of gap 218 is approximately equal to D1. If the sphere does not fit within the gap, or fits in the gap with excess space, spheres having a diameter less than or greater than D1 are positioned adjacent to or within gap 218 until a snug fit is achieved and the width of gap 218 is determined.

In an exemplary embodiment, gaps of eyewear 200 are measured at three locations on upper peripheral edge 211 and lower peripheral edge 212 of each lens, for example at locations "a" through "l," such that gaps are measured at 12 locations. In various exemplary embodiments, fewer or additional locations may be measured, or may be measured adjacent to a single lens.

In general, smaller gap size suggests a higher level of protection provided by an eyewear article because a smaller gap provides less space for contaminants, debris or projectiles to pass behind the eyewear article. The measured gap sizes may be compared to a predetermined gap size G0 to determine whether the gap size is acceptable. Predetermined gap size G0 may be selected to provide a sufficiently small gap for a particular application or may be established by a standard setting organization as providing an acceptable gap, for example. In various exemplary embodiments, less than 12 mm, 10 mm, 8 mm or another value may be determined to be an acceptable gap size, and thus predetermined value G0 is selected to be 12 mm, 10 mm, 8 mm or another suitable value.

The gap or gaps formed between one or more peripheral edges of an eyewear article may not be of uniform size and may vary among different locations around the eyewear article. Accordingly, in an exemplary embodiment, gap sizes measured at one or more locations are individually compared to a predetermined acceptable gap size. In other exemplary embodiments, the average gap size around the periphery of the eyewear is compared to a predetermined acceptable average gap size, or gap size at different locations may be given a higher or lower weighting in calculating an average gap size or gap size factor.

Fit of safety eyewear is further evaluated in an exemplary method of the present invention by evaluating the field of view of the wearer when an eyewear article is positioned for use on the wearer. In general, it is desirable for a wearer to be able to see in all normal directions of eye rotation without major impediment or interference to the field of view, such that the eyewear frame, lens edge, or other feature does not significantly limit the view of a wearer. Eyewear that does not fit appropriately on the face of a particular wearer, or is not sized appropriately for a particular wearer, may undesirably limit the field of view of a wearer.

In an exemplary method of the present invention, the field of view of a wearer is evaluated by moving an object in and around the field of view of a wearer to determine visibility while the eyewear article is positioned for use. The wearer may provide an indication regarding whether the eyewear article interferes with or obscures the object while positioned in the normal field of view. Alternatively, or in addition, a wearer may simply comment on whether the eyewear article interferes with or obscures the normal field of view.

In another exemplary embodiment, a wearer may have a normal field of view that extends 0 degrees, such as 100 degrees, from the vertical meridian of the wearer in a horizontal direction, for example. Accordingly, an object positioned inside this field of view should be visible if an eyewear article does not interfere with the field of view when the eyewear article is positioned for use. An eyewear article limits the field of view if the object is obscured within 100 degrees from the vertical meridian in a horizontal direction, or within a predetermined distance from the normal field of view, such as within 20 degrees from a boundary of the normal field of view. In addition to horizontal directions, the field of view may be determined in other directions.

Fit of safety eyewear is further evaluated in an exemplary method of the present invention by evaluating the security of an eyewear article when positioned for use on the face of a wearer. Eyewear, and specifically eyewear used for safety protection, desirably fits securely on a wearer such that the eyewear article does not readily move out of position or fall from the face of the wearer during movement of the head and/or body of the wearer.

In an exemplary embodiment, security of an eyewear article is evaluated by observing movement of an eyewear article during head movement. An eyewear article is said to be insecure on a particular wearer if the eyewear article moves excessively during normal head movement, such as shaking of the head, nodding up and down, jogging in place, or other activity resulting in head movement. Similarly, security of an eyewear article may be evaluated by observing movement of an eyewear article when the orientation of the wearer's head changes, such as when bending over. If the eyewear article moves out of a position of use, the eyewear article can be said to be insecure.

In another exemplary embodiment, security of an eyewear article may be evaluated by comparing features and characteristics of an eyewear article to features and characteristics of the head and face of particular wearer. For example, many traditional eyewear articles include temple portions that rest on or above the ears of a wearer and exert a force on the head of the wearer. The force exerted on a wearer is dependent in part on the materials and geometry of the eyewear article and the dimensions of a wearer's head. Force exerted on a wearer is often related to the width of a wearer's head, and thus force exerted by an eyewear article may be determined for a range of head sizes. Accordingly, a measurement of head width, together with known characteristics of an eyewear article, may be used to evaluate the security of an eyewear article on a particular wearer by providing a prediction regarding the force exerted by an eyewear article positioned for use on a wearer.

In an exemplary embodiment of the method according to the present invention, evaluation of coverage and gap as described above is performed using a specialized tool or gauge. FIG. 3 shows an exemplary embodiment of an eyewear fit measuring tool 300 according to the present invention. Tool 300 includes an elongate body 310 having first and second major surfaces 311 and 312, and first and second end portions 321 and 322. A first sphere 331 having a diameter D1 is positioned proximate first end portion 321. In an exemplary embodiment, sphere 331 is joined to elongate body 310 by a reduced portion 315 exhibiting a width, thickness, and/or diameter that is smaller than that exhibited by elongate body 310. In some exemplary embodiments, second sphere 332 having a diameter D2 is positioned proximate second end portion 322, and the diameter D2 may be the same or different than diameter D1. First and second spheres 331 and 332 may be positioned adjacent to or within a gap between an eyewear article and face of a wearer to determine the size of a gap, such as gap 218 of FIG. 2, as described above.

First major surface 311 of elongate body 310 is calibrated with a scale 312 adapted to facilitate evaluation of coverage provided by an eyewear article, as described above. Scale 312 includes a zero location 313 positioned near a central location of elongate body 310 and markings that increase or decrease in magnitude in a direction away from zero location 313 towards each of the first and second end portions 321 and 322. For example, zero location 313 is marked with the numeral zero, logo, or other indicia, and numerals representing a distance from zero location 313 are exhibited along at least a portion of the elongate body. Alternatively or in addition, various locations may be indicated by a stylized numeral, logo, or other indicia. For example, scale 312 may include markings representative of a predetermined distance that can be used to determine whether or not coverage provided by eyewear on the face of a wearer is sufficient, such as predetermined value V0 or H0 as described above. In an exemplary embodiment, scale 312 includes only a zero location 313 and markings representative of a predetermined distance that can be used to determine whether or not coverage provided by eyewear on the face of a wearer is sufficient, such as predetermined values V0 and H0. Tool 300 may be made from an opaque or colored material, such as a material that enhances the visibility of a scale or other indicia on tool 300. Alternatively, tool 300 may be a transparent or translucent material, and such a material may be selected to assist in aligning zero location 313 in front of the center of a pupil and in measuring distances to a peripheral edge of the eyewear, for example.

In an exemplary method according to the present invention, tool 300 may be used to evaluate coverage, gap, and/or other parameters in evaluating the fit of eyewear positioned for use on a wearer. To evaluate coverage in first and second vertical directions V1 and V2, for example, tool 300 is oriented vertically and positioned such that zero location 313 is in front of a center of a pupil of the wearer. A first vertical distance V1 between zero location 313 in front of the wearer's pupil and an upper peripheral edge may be measured using scale 312, or by observing whether the upper peripheral edge is positioned above or below a marking representative of predetermined value V0. Similarly, a second vertical distance V2 between zero location 313 in front of the wearer's pupil and a lower peripheral edge may be measured using scale 312, or by observing whether the lower peripheral edge is positioned above or below a marking representative of predetermined value V0. Markings representative of a predetermined value allow an immediate determination of whether coverage is sufficient in the measured direction, and reduce the need to perform multiple steps of first measuring a distance and subsequently comparing the distance to a predetermined value. First and second horizontal distances H1 and H2 may similarly be evaluated by positioning tool 300 in a horizontal orientation, and measuring first and second horizontal distances H1 and H2 between a zero location 313 in front of the wearer's pupil and inner and outer peripheral edges or observing whether the inner or outer peripheral edges, respectively, are positioned inside or outside of a marking representative of a predetermined value H0.

In an exemplary embodiment of the present invention, tool 300 is included in a kit for evaluating the fit of eyewear. For example, a kit may include one or more tools, such as tool 300, with each tool having spheres of different diameters. A first tool may include first and second spheres of diameter D1 and D2, and a second tool may include third and fourth spheres of diameter D3 and D4 that are different than diameters D1 and D2. In this way, an evaluator is provided with several spheres that can be used to measure one or more gaps, for example.

In an exemplary embodiment, the kit for evaluating fit of eyewear further includes a form for documenting the evaluation of one or more of coverage provided by the eyewear, presence and/or size of one or more gaps between an eyewear article and the face of a wearer, field of view of the wearer when the eyewear article is positioned for use, and security of the eyewear on the face of a wearer. The kit further includes instructions for evaluating the fit of eyewear according to a method of the present invention.

Figure 4:
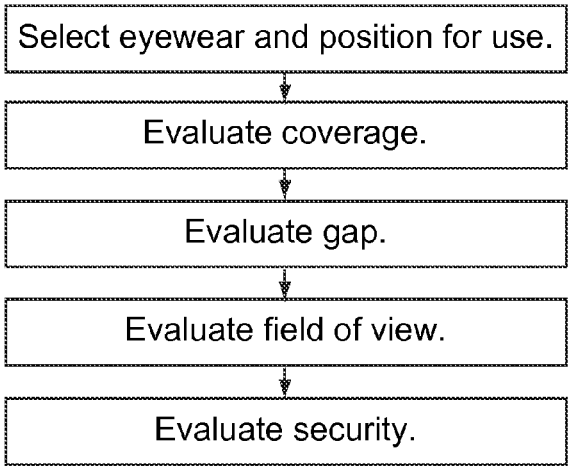
FIG. 4 is a flow chart of an exemplary method according to the present invention.

FIG. 4 is a flow chart illustrating an exemplary embodiment of evaluating the fit of eyewear including steps of evaluating parameters that affect the fit of eyewear on a particular individual. In an initial step, a wearer selects an eyewear article from an inventory of one or more available eyewear articles and the eyewear is positioned for use on the face of the wearer. In selecting an eyewear article, various considerations including style, appearance, size, expected comfort, application, and other factors may be considered. The coverage of the eyewear is then evaluated as described above. That is, one or more distances, such as distance V1, V2, H1 and H2, for example, are measured and/or compared to a predetermined value V0, H0, or other predetermined value. In an exemplary embodiment, coverage is evaluated using tool 300 shown in FIG. 3. If one or more values suggest that coverage is not sufficient, the eyewear is removed, a new eyewear article is selected and positioned for use, and coverage provided by the new eyewear article is evaluated. This process is continued until eyewear is found that provides a desired level of coverage on the wearer.

After coverage is evaluated, a gap between the eyewear article and the face of a wearer is evaluated by measuring the distance between a peripheral edge of the eyewear and the face of a wearer at one or more locations when the eyewear article is positioned for use on the wearer, as described above. In an exemplary embodiment, gap is evaluated using tool 300 shown in FIG. 3. If one or more measured values suggest that an excessive gap is present, the eyewear is removed, a new eyewear article is selected and positioned for use, and the presence and gap size exhibited with the new eyewear article is evaluated. This process is continued until an eyewear article is selected that provides a sufficiently small gap size when the eyewear article is positioned for use on the wearer.

The exemplary method further includes steps of evaluating field of view of the wearer when the eyewear article is positioned for use, as described above. If the eyewear excessively interferes with or obstructs the normal field of view of the wearer, the eyewear is removed, a new eyewear article is selected and positioned for use, and field of view is evaluated with the new eyewear article. This process is continued until an eyewear article is selected that does not excessively interfere with or obstruct the field of view when the eyewear article is positioned for use on the wearer.

The exemplary method further includes steps of evaluating security when the eyewear article is positioned for use, as described above. If the eyewear article moves out of position during normal head movement, for example, the eyewear is removed, a new eyewear article is selected and positioned for use, and security is evaluated with the new eyewear article. This process is continued until an eyewear article is selected that provides adequate security when positioned for use on the wearer.

In various exemplary embodiments of the method of the present invention, the order of evaluating each parameter may be varied such that parameters are evaluated in any desired sequence. Further, all or only a subset of the parameters may be evaluated before selecting a new eyewear article in the event an eyewear article does not provide sufficient coverage, gap, view or security, for example. The results of the evaluation of one or more of coverage, gap, view or security are used to select a new eyewear article that may be more likely to provide a desired fit. For example, if a particular eyewear model, size or configuration does not provide adequate coverage on the face of a particular wearer, a subset of the available eyewear models, sizes or configurations may be eliminated as possible eyewear selections for a wearer.

In an exemplary embodiment, all parameters are evaluated for an eyewear article before a determination is made that the eyewear article provides an acceptable fit on a particular wearer. That is, when a new eyewear article is selected after one or more parameters were found to be insufficient with a previously selected eyewear article, all parameters are evaluated for the new eyewear article.

Figure 5:
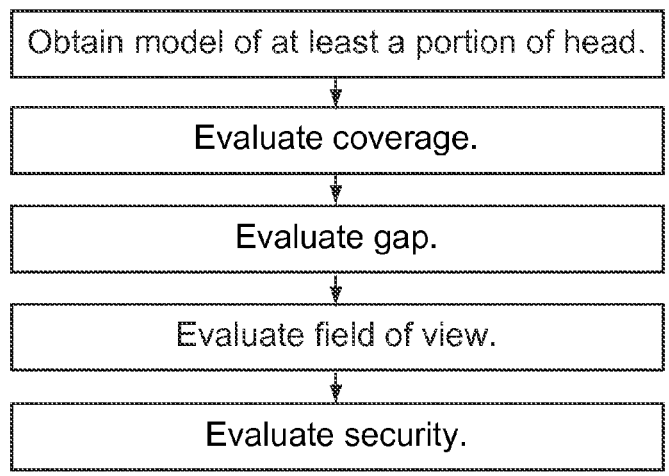
FIG. 5 is a flow chart of an exemplary method according to the present invention including the step of obtaining a model of at least a portion of the head of a wearer.

The present invention further provides for an automated or semi-automated method of evaluating fit. FIG. 5 is a flow chart illustrating an exemplary method according to the present invention that includes the steps of obtaining a model of at least a portion of a wearer's head and evaluating various parameters of fit using the model of at least a portion of a wearer's head and one or more eyewear article models. The model may be any representation comprising a collection of spatial coordinates, for example, that provides an accurate depiction of at least a portion of the wearer's head. In an exemplary method, coverage provided by one or more safety eyewear articles over the wearer's face is evaluated by comparing the model of at least a portion of the wearer's head with one or more safety eyewear article models, and one or more gaps formed between a peripheral edge of one or more safety eyewear articles and the wearer's face are evaluated by comparing the model of at least a portion of the wearer's head with one or more safety eyewear article models.

The model of at least a portion of a wearer's head may be one or more two-dimensional images, a three-dimensional image, facial recognition scan, or other suitable imaging or modeling technique as known in the art that allows features of a head to be identified and located. For example, a series of two or more two-dimensional images obtained from different orientations or angles may provide three-dimensional information about a wearer's head. Alternatively, a video or scan of at least a portion of a user's head may be used to obtain a model.

The model of at least a portion of a user's head may be used in determining a plurality of characteristic dimensions of the wearer. For example, position of a user's eyes, ears, and nose, distance between pupils, position and location of the brow and cheek bones, and relative dimensions of such features are determined. An entire head may be characterized, or a discrete number of characteristic features may be analyzed. For example, 20 to 40 points on a face and/or head that contribute to the fit of eyewear may be located.

Similarly, an eyewear article model may be provided or generated in the form of a three-dimensional CAD model, or from one or more images from which three-dimensional information may be obtained, or other suitable technique as known in the art. The eyewear article model can be used to determine a plurality of characteristic dimensions of the eyewear article, or the model itself may be a collection of characteristic dimensions and features of the eyewear article.

The fit of an eyewear article on the face of a wearer is then evaluated by comparing features and characteristics of the eyewear article model to features and characteristics of the model of at least a portion of the wearer's head. In an exemplary method, an eyewear article model is superimposed onto the model of at least a portion of the wearer's head such that a model or image is created in which the safety eyewear article is in a position of use. The eyewear model may be positioned by matching one or more locations of the eyewear model with a corresponding location of the model of at least a portion of the wearer's head. Various parameters of fit, including for example, coverage and presence and/or size of gaps may be evaluated as described above with reference to FIGS. 1 and 2. For example, computer analysis of the composite model may be performed to evaluate coverage along first and second vertical distances V1 and V2 and along first and second horizontal distances H1 and H2. Further, gap size may be evaluated at one or more locations by determining the distance between a peripheral edge of the eyewear article model and the model of at least a portion of the wearer's head.

In various exemplary embodiments, characteristic dimensions of the model of at least a portion of a wearer's head and characteristic dimensions of one or more eyewear article models are directly compared, without creating a composite image or model, to evaluate coverage, gap, field of view, security and/or other parameters.

In another exemplary embodiment of the method of the present invention, a model of at least a portion of the wearer's head is obtained while an eyewear article is positioned for use on the wearer. A model obtained while an eyewear article is positioned for use on the wearer allows analysis of the model to determine various parameters of fit without a step of superimposing an independently created eyewear model onto a model of at least a portion of a wearer's head. For example, the model of at least a portion of a wearer's head obtained while an eyewear article is positioned for use can be analyzed to determine coverage provided by the eyewear article and the presence and/or size of gaps between a peripheral edge of the eyewear and the wearer's face. In another exemplary embodiment, a model of at least a portion of the wearer's head is obtained without eyewear, and a model of at least a portion of the wearer's head is obtained while an eyewear article is positioned for use on the wearer. The model obtained while eyewear is positioned for use on the wearer provides a model of an eyewear article, and the two models may be compared to evaluate coverage provided by the eyewear article over the wearer's head and to evaluate a gap formed between a peripheral edge of the eyewear article over the wearer's face. For example, the position of a peripheral edge of the eyewear may be determined from the model obtained while an eyewear article is positioned for use, and a position on the wearer's face behind the peripheral edge can be obtained from the model obtained without eyewear. The difference between the two positions provides a measurement of gap. Coverage and other parameters of fit may be similarly evaluated. Such a method may provide a more accurate evaluation of fit because the step of superimposing an eyewear model onto a model of at least a portion of a wearer's head is not required.

Evaluation of coverage and gap can be used to facilitate selection of an eyewear article that fits appropriately on the face of a particular wearer. The above steps of evaluating various parameters of fit provided by a safety eyewear article by comparing the model of at least a portion of the wearer's head with a safety eyewear article model may be quickly repeated with several eyewear article models. Thus, a single model of at least a portion of a wearer's head may be used to evaluate fit provided by many eyewear articles. Analysis of an inventory of eyewear article models and the model of at least a portion of the wearer's head may be used to provide a shortened list of suggested eyewear that is expected to provide a desired fit on the wearer or a recommendation of a specific eyewear article likely to provide the best fit on the wearer. Optionally, eyewear selected from this list may be positioned for use on the wearer and physically evaluated according to the method described above to confirm the results of an automated or semi-automated evaluation.

The methods and tools for evaluating eyewear fit described herein provide several benefits. Evaluation of a combination of parameters including gap, coverage, security, and field of view provides an efficient and precise method of evaluating fit of eyewear on a particular individual. Each wearer has unique facial features and characteristics that cause a particular eyewear article to fit in a unique manner. Although eyewear may be designed to provide a specified level of coverage on a head form representative of a subset of a population, for example, an eyewear article may fit slightly different when positioned for use on a wearer having features different than the head form. For example, the eyewear article may sit higher or lower than expected on the face of a wearer, and thus coverage in a first vertical direction V1 may be sufficient, while coverage in a second vertical direction V2 may or may not be sufficient. Because the method of the present invention allows fit to be evaluated for a particular individual, a determination can be made as to whether an eyewear article provides a desired level of fit on the particular individual that previously could not be made based only on analysis of the eyewear article itself, or the eyewear article as compared to a head form having specified characteristic dimensions.

The present invention has now been described with reference to several embodiments thereof. The foregoing detailed description has been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details described herein, but rather by the language of the claims and the equivalents thereof. Any feature or characteristic described with respect to any of the above embodiments can be incorporated individually or in combination with any other feature or characteristic, and are presented in the above order and combinations for clarity only.

What is claimed is:

1. A gauge for evaluating fit of an eyewear article, comprising:
   an elongate body having first and second major surfaces and first and second end portions;
   a first sphere having a diameter D1 proximate the first end; and
   a second sphere having a diameter D2 proximate the second end;
   wherein the first major surface is calibrated with a scale extending between the first and second end portions comprising a marked zero location and markings on each side of the zero location, and wherein diameter DI is different than diameter D2, and wherein the markings on each side of the zero location include:
   first indicia and second indicia different from the scale markings at opposite sides of the zero location and designating a predetermined minimum distance from the zero location for eyewear coverage in a vertical direction; and
   third indicia and fourth indicia apart from the first and second indicia and different from the scale markings, the third and fourth indicia being at opposite sides of the zero location and designating a predetermined minimum distance from the zero location for coverage in a horizontal direction.

2. The gauge of claim 1, wherein the markings on each side of the zero location are representative of a predetermined distance from the zero location to provide an indication whether coverage of an eyewear article on the face of a wearer in a particular direction is sufficient.

3. The method of claim 1, wherein the step of evaluating a gap comprises determining a distance between a lowermost peripheral edge of the eyewear article and soft tissue of the wearer away from the wearer's eyes at a location along the lowermost peripheral edge.

4. A method of evaluating an eyewear article for use as safety eyewear, comprising:
   (1) obtaining a model of at least a portion of a wearer's head and a model of at least an eyewear article;
   (2) evaluating coverage provided by the eyewear article over the wearer's face in response to a difference between the model of at least a portion of the wearer's head and the model of at least the eyewear article;
   (3) evaluating a gap formed between a peripheral edge of the eyewear article and the wearer's face in response to a difference between the model of at least a portion of the wearer's head and the model of at least the eyewear article; and
   (4) determining an ability of the eyewear article to function as safety eyewear for the wearer in protecting the wearer's eyes and face based upon the evaluations of steps (2) and (3), wherein steps (2) and (3) further comprise using the gauge of claim 1; and
   (5) providing a suggestion as to whether the eyewear article is expected to provide a desired fit on the wearer in response to at least one of coverage in a vertical direction, coverage in a horizontal direction, and the gap.

5. The method of claim 4, wherein the model of at least the eyewear article is obtained while an eyewear article is positioned for use on the wearer.

6. The method of claim 4, wherein the step of evaluating coverage comprises:
   analyzing the models to determine a first vertical distance V1 between a location on the eyewear article in front of a center of a pupil of the wearer and an upper peripheral edge of the eyewear article in a substantially vertical direction;
   comparing the first vertical distance V1 with a predetermined value V0; and
   designating the eyewear article as not providing sufficient coverage for the wearer as safety eyewear when the first vertical distance V1 is less than the predetermined value V0.

7. The method of claim 6, further comprising analyzing the models to determine a second vertical distance V2 between a location on the eyewear article substantially in front of a center of a pupil of the wearer and a lower peripheral edge of the eyewear article in a substantially vertical direction.

8. The method of claim 4, wherein the step of evaluating coverage further comprises:
   analyzing the models to determine a first horizontal distance H1 between a location on the eyewear article substantially in front of a center of a pupil of the wearer and an outer peripheral edge of the eyewear article in a substantially horizontal direction;
   comparing the first horizontal distance H1 with a predetermined value H0; and
   designating the eyewear article as not providing sufficient coverage for the wearer as safety eyewear when the first horizontal distance H1 is less than the predetermined value H0.

9. The method of claim 8, further comprising analyzing the models to determine a second horizontal distance H2 between a location on the eyewear article substantially in front of a center of a pupil of the wearer and an inner peripheral edge of the eyewear article in a substantially horizontal direction.

10. The method of claim 4, wherein the step of evaluating a gap comprises analyzing the models to determine a size of a gap between a peripheral edge of the eyewear article and the wearer's face.

11. The method of claim 4, further comprising, before or after one or both of steps (2) or (3):
   (4) evaluating field of view of the wearer by analyzing the models to determine whether the eyewear article interferes with the wearer's field of view.

12. The method of claim 4, further comprising, before or after one or both of steps (2) or (3):
   (5) evaluating security by analyzing the models.

13. The method of claim 4, further comprising:
   (6) selecting one or more eyewear articles based on steps (2) and (3).

14. The method of claim 4, wherein steps (2) and (3) occur in any order.

15. The method of claim 4, wherein the step of evaluating a gap comprises determining a distance between a peripheral edge of one or more eyewear articles and the wearer's face at a plurality of locations along the peripheral edge.

16. A method of evaluating an eyewear article for use as safety eyewear, comprising:
   (1) positioning an eyewear article for use on a wearer;
   (2) evaluating coverage provided by the eyewear article on the wearer's face;
   (3) evaluating a gap formed between a peripheral edge of the eyewear article and the wearer's face by measuring a distance between a peripheral edge of the eyewear article and the wearer's face;
   (4) evaluating field of view of the wearer;
   (5) evaluating security of the eyewear article on the wearer during movement of the wearer's head; and
   (6) determining an ability of the eyewear article to function as safety eyewear for the wearer in protecting the wearer's eyes and face based upon the evaluations of steps (2) through (5),
   wherein steps (2) and (3) further comprise using the gauge of claim 1.

17. The method of claim 16, wherein steps (2) through (5) occur in sequence.

18. The method of claim 16, wherein steps (2) through (5) occur in any order.

19. The method of claim 16, wherein the step of evaluating coverage comprises:
   measuring a first vertical distance V1 between a location on a lens of the eyewear article substantially in front of a center of a pupil of the wearer and an upper peripheral edge of the eyewear article in a substantially vertical direction;
   comparing the first vertical distance V1 with a predetermined value V0; and
   designating the eyewear article as not providing sufficient coverage for the wearer as safety eyewear when the first vertical distance V1 is less than the predetermined value V0.

20. The method of claim 19, wherein the step of evaluating coverage further comprises measuring a second vertical distance V2 between a location on the lens substantially in front of a center of a pupil of the wearer and a lower peripheral edge of the eyewear article in a substantially vertical direction.

21. The method of claim 16, wherein the step of evaluating coverage comprises:
   measuring a first horizontal distance H1 between a location on the eyewear article substantially in front of a center of a pupil of the wearer and an outer peripheral edge of the eyewear article in a substantially horizontal direction;
   comparing the first horizontal distance H1 with a predetermined value H0; and
   designating the eyewear article as not providing sufficient coverage for the wearer as safety eyewear when the first horizontal distance H1 is less than the predetermined value H0.

22. The method of claim 21, wherein the step of evaluating coverage further comprises measuring a second horizontal distance H2 between a location on the eyewear article substantially in front of a center of a pupil of the wearer and an inner peripheral edge of the eyewear article in a substantially horizontal direction.

23. The method of claim 16, wherein the step of evaluating a gap comprises measuring a gap between a peripheral edge of the eyewear article and the wearer's face by attempting to insert a sphere of known diameter D1 into the gap.

24. The method of claim 16, wherein the step of evaluating the field of view of the wearer comprises moving an object in and around the field of view of the wearer.

25. The method of claim 16, further comprising:
   selecting another eyewear article different than the eyewear article from an inventory of eyewear articles for potential use as safety eyewear for the wearer based on steps (2) through (5) when it is determined at step (6) that the eyewear article is not suitable as safety eyewear for the wearer.

* * * * *

UNITED STATES PATENT AND TRADEMARK OFFICE
CERTIFICATE OF CORRECTION

PATENT NO. : 9,507,175 B2  Page 1 of 1
APPLICATION NO. : 13/652854
DATED : November 29, 2016
INVENTOR(S) : Karen Cuta It is certified that error appears in the above-identified patent and that said Letters Patent is hereby corrected as shown below:

In the Claims

Column 12
Line 57, in Claim 1, delete "DI" and insert -- D1 --, therefor.

Signed and Sealed this
Ninth Day of May, 2017

Michelle K. Lee
*Director of the United States Patent and Trademark Office*